May 13, 1924.
C. A. WARD
BATTERY CRADLE
Filed Jan. 17, 1920
1,493,834
4 Sheets-Sheet 1
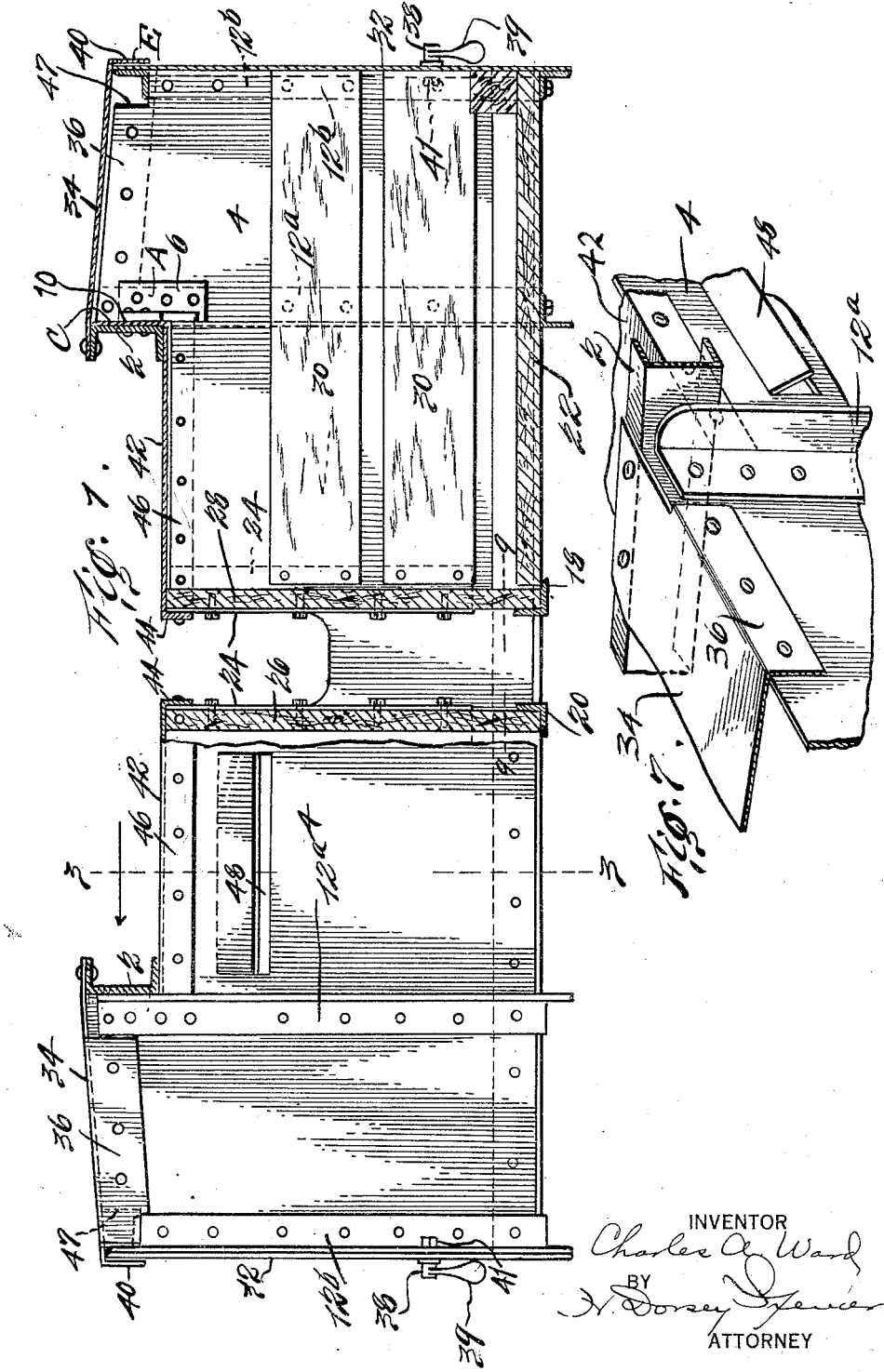
INVENTOR
Charles A. Ward
BY
ATTORNEY

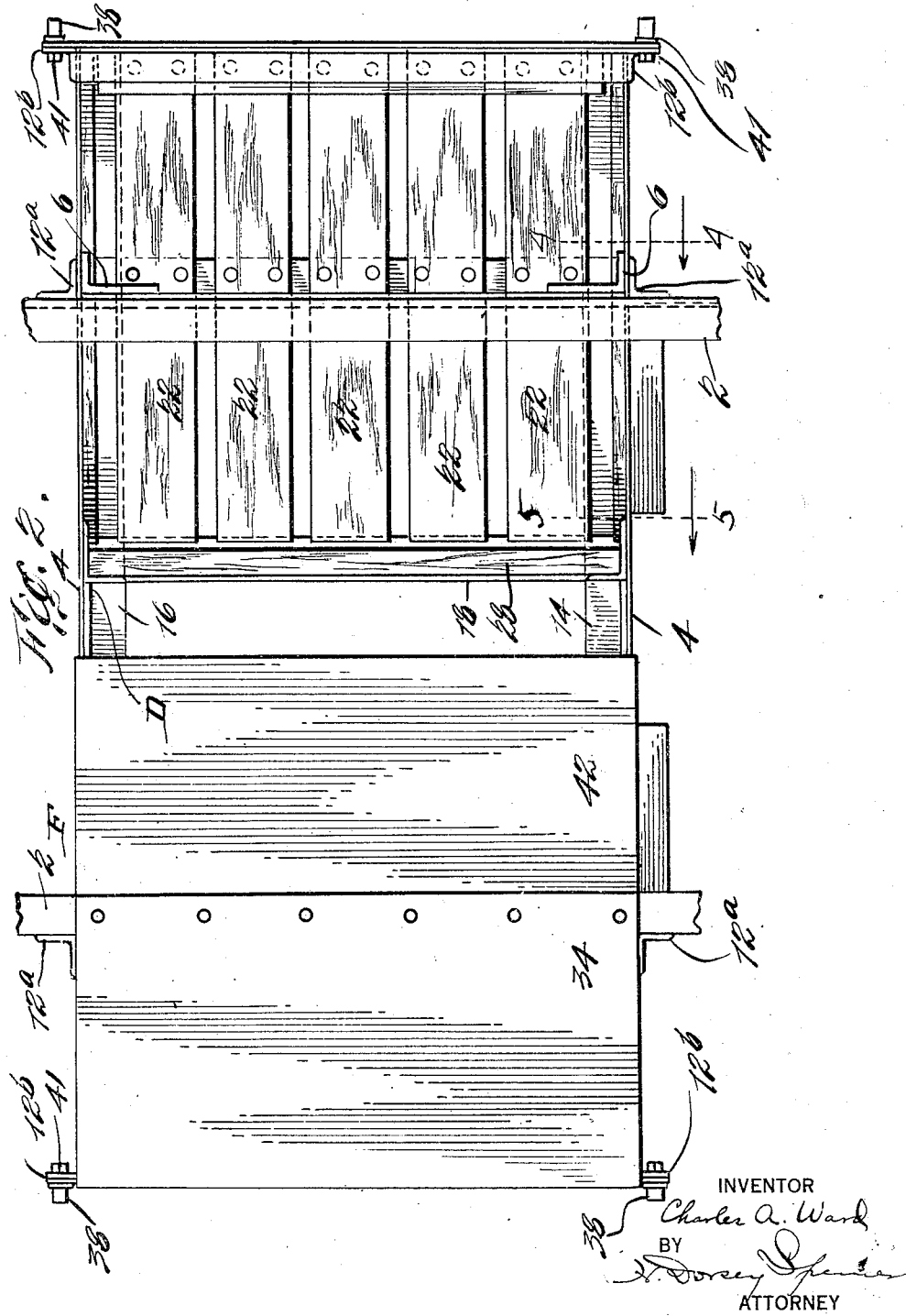

May 13, 1924.  
C. A. WARD  
BATTERY CRADLE  
Filed Jan. 17, 1920    4 Sheets-Sheet 3
1,493,834
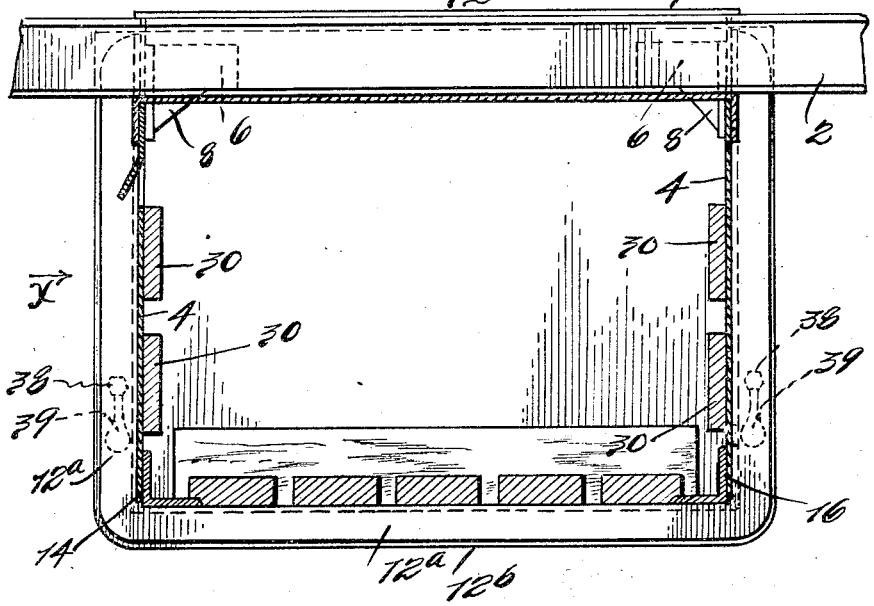
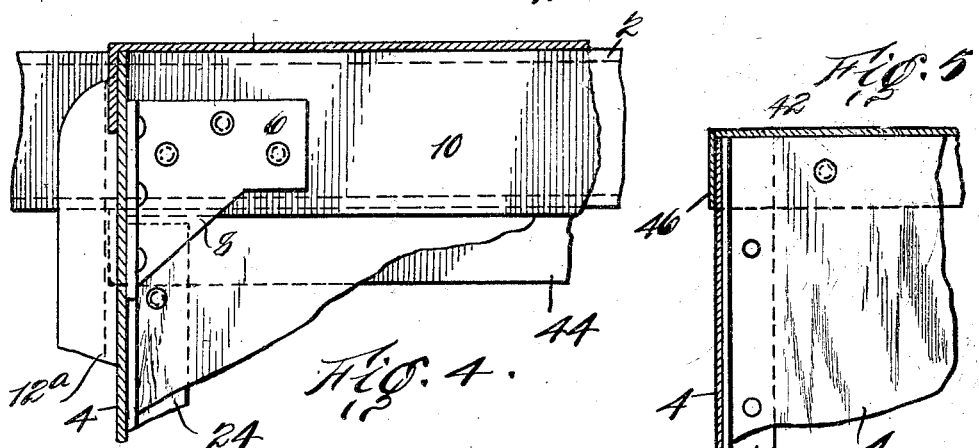
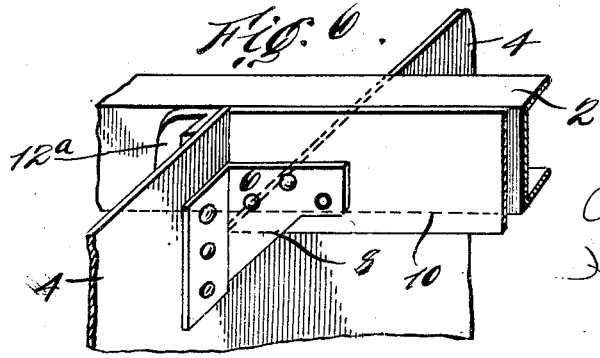
INVENTOR  
Charles A. Ward  
BY  
H. Dorsey Spencer  
ATTORNEY

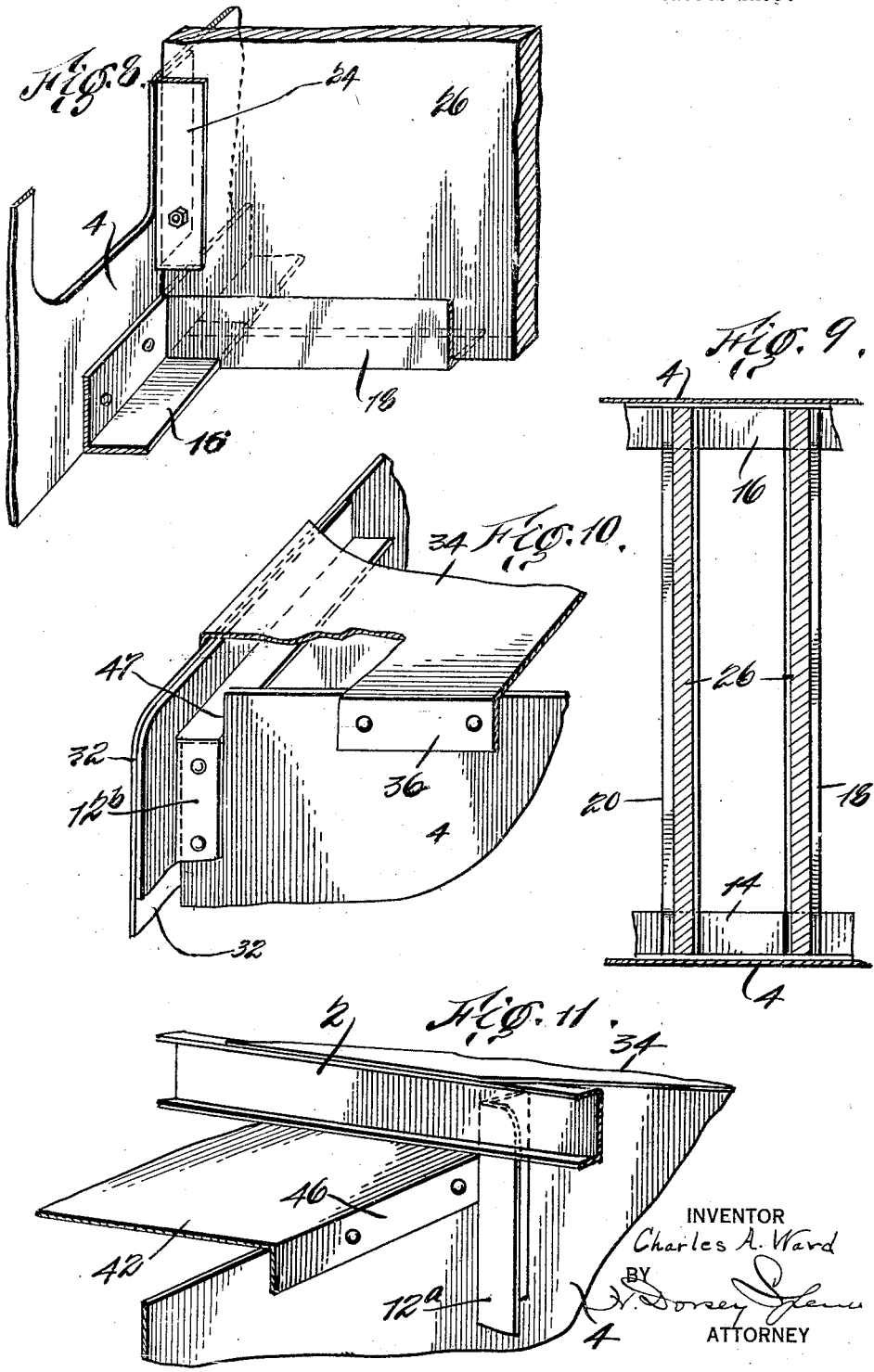

Patented May 13, 1924.

1,493,834

UNITED STATES PATENT OFFICE.

CHARLES A. WARD, OF MOUNT VERNON, NEW YORK.

BATTERY CRADLE.

Application filed January 17, 1920. Serial No. 352,037.

*To all whom it may concern:*

Be it known that I, CHARLES A. WARD, a citizen of the United States, residing at Mount Vernon, county of Westchester, and State of New York, have invented certain new and useful Improvements in Battery Cradles, of which the following is a clear, full, and exact description.

This invention relates to cradles or supports for the batteries of electrically driven vehicles, and an object of my invention is to provide a strong compact and convenient battery cradle or support which may be so suspended from the vehicle frame as properly to distribute its load upon the frame structure and at the same time to avoid local strains tending to distort any part of the frame.

A particular object of the invention is so to construct and to mount the battery cradle or support that the battery cells are readily accessible for refilling or other attention.

An important feature of the invention is the means for suspension of the cradle or support from the side frame members in such manner that the gravity pull of the battery weight is substantially in the plane of the web portions of these members.

Other objects and important features of the invention will be apparent from the following description and claims when taken in connection with the accompanying drawings, in which—

Figure 1 is an end elevation partly in section.

Figure 2, a plan view, the top plates at one side being removed.

Figure 3, a section on the line 3—3 Figure 1.

Figure 4, an enlarged fragmentary sectional view on the line 4—4, Figure 2.

Figure 5, a similar view on the line 5—5, Figure 2.

Figure 6, a perspective view of an inside corner at A, Figure 1;

Figure 7, a perspective view of an outside corner at C, Figure 1;

Figure 8, a perspective view of an inside corner at D, Figure 2;

Figure 9, a plan view on line 9—9, Figure 1;

Figure 10, a perspective view of an outside corner at E, Figure 1; and

Figure 11, a perspective view of an outside corner at F, Figure 2.

Referring to the drawings, the chassis of the vehicles comprises a frame including the longitudinal frame members 2, by which members the entire battery cradle is supported. This battery cradle comprises end trussed members connected by side members which also are in effect trusses, forming thereby a very rigid support for the batteries.

Each end trussed member is connected directly to a frame member 2 and comprises an end plate 4, each of said plates having substantially the shape shown in Figure 1, the plates being cut away at their central portions to allow proper clearance for the vehicle motor shaft. Each end plate 4 is fastened to the frame member 2 by two brackets 6, one bracket connected to the right-hand member 2, shown in Figure 1, and the other bracket connected to the left-hand member, shown in Figure 6. The frame members 2 are preferably channel bars, and the brackets 6 are riveted to the web portions of said channel bars and are situated within the cradle. The end plates 4 are riveted or otherwise fastened directly to the brackets 6. The brackets 6 have the general form, such as shown in Figure 4, and to give greater strength thereto are provided with the web portion 8. Said brackets 6 are not fastened directly to the web portion of the channel bars 2, but a plate 10 is interposed between the bracket 6 and each of the frame members 2, said plate being formed by bending up portions of the plate 42, as shown in Fig. 1. These plates extend on each side of the cradle between the plates 4, one end of the plate 10 abutting the forward plate 4, as shown in Figure 6, and the other end abutting the rear plate 4, as shown in Figure 2, said Figure 2 also showing the forward plate 4. Outside of each plate 4 adjacent to each of the frame members 2 is a stirrup-shaped flanged member $12^a$, shown in Figure 3. These members are in effect angle bars bent or otherwise formed into a U shape, and are riveted to plates 4 by one of their angles, the other angle extending at right angles to the first and serving to give strength to the cradle and resist distortion. Two members $12^b$ similar in construction to the members $12^a$, except that they are entirely closed across the top of the U, forming quadrangular members, are riveted in a manner similar to the members 12ª, at the extreme ends of the plates 4. The U members 12ª and the quadrangular members 12ᵇ, together with the plates 4 riveted to said members, form in effect a wide I beam, the plates 4 forming the web of the beam. The structure thus formed effectually resists any distortion in the direction of the arrow X, Figure 3.

In order to resist strains coming upon the battery cradle transverse to the vehicle, I provide transverse angle bars 14 and 16, shown in Figures 2, 3 and 9, the bar 14 being also shown in Figure 8. These bars extend entirely across the cradle and are supported by the members 12ª and 12ᵇ, to which they are riveted by one of their angles. They are riveted by their other angle to the plates 4, as shown in Figures 1 and 3.

The flooring, forming the direct support for the battery cells, is preferably arranged in two sections, one section on each side of the drive shaft, and to support the ends of floor beams adjacent to the drive shaft, I provide angle members 18 and 20, shown in section in Figure 1, and shaped as indicated in Figure 8, said members being bent up a little at each end to pass above the horizontal angles of the bars 14 and 16 respectively, to which angles they are secured. The floor beams 22, Figure 1, rest at their left-hand end on the horizontal angle of the member 18, and are secured by bolts or otherwise to the stirrup members 12ª and to the quadrangular members 12ᵇ. The floor beams on the left-hand section of the cradle are similarly supported and secured.

Riveted to the plates 4 are angle members 24, which members extend from the top of the plates 4, as shown in Figure 5, to a distance a little short of the top of the vertical angle of the bars 14 and 16, as shown in Figure 8, in which figure the bar 14 only is shown. Bolted to these angle members are the walls 26 and 28, which are preferably made of oak plank, as is also the floor 22. Transverse planking 30 is also used, these planks being secured to the end plates 4, as shown.

Each of the end plates 4 is higher at its two ends than in the middle, the purpose of this construction being to provide room to reach into the battery cradle and fill or otherwise give attention to the battery cells farthest from the side doors 32. These doors are in the form of plates and slip under the flanges of coverplates 34, which coverplates are fastened to the plates 4 by means of flanges 36. The doors may be secured in place by suitable fastening devices but are preferably secured by the novel fastening devices herein shown, which consist of a nut 38 having attached to or integral therewith a weight 39 which tends to hold the nut always in a certain position. The weight 39 also forms a convenient handle for use in unscrewing the nut. Such a weighted nut does not come loose as a result of the jarring of the vehicle. When the doors have been slipped under the flanges 40 of the cover plate 34, the nuts 38 which are secured upon bolts 41 passing through the flanges of the quadrangular members 12ᵇ are screwed up against the doors, thus holding them securely in closed position.

Coverplates 42, having flanges 10, 44 and 46, Fig. 1, are provided for the lower portion of the battery cradle sections, the flanges 44 being fastened to one of the angles of members 24, while the flanges 46 are fastened to the plates 4. The flanges 10 are connected to the frame members 2, as hereinabove set forth.

The plates 4 are cut away at 47, as shown in Fig. 1 and Fig. 10, these cut away portions being for the purpose of permitting the top horizontal angle of each of the quadrangular members 12ᵇ to extend across unbroken.

Openings 48, made by cutting and bending out a portion of plate 4, serve to ventilate the battery cradle.

In order to install the batteries, the doors 32 are opened and the batteries slipped into place from each side. When the batteries need any attention, those situated farthest from either door can be readily reached, due to the additional elevation of the battery cradle structure on each side.

Having thus described my invention, what I desire to claim and secure by Letters Patent is:

1. A battery cradle adapted to be supported from the frame side members of an electric vehicle, said cradle comprising, in combination, bottom supporting bars extending across the vehicle frame and beyond the sides thereof, a U-frame carried by each side member of the vehicle frame for suspending said bottom supporting bars from said vehicle frame, and sheet metal combined cradle side walls and frame truss members rigidly connected both to said bars and to said U-frames.

2. A battery cradle adapted to be supported from the frame side members of an electric vehicle, said cradle comprising, in combination, bottom supporting bars extending across the vehicle frame and beyond the sides thereof, a U-frame carried by each side member of the vehicle frame for suspending said bottom supporting bars from the vehicle frame, other frames at the ends of said bars, and sheet metal combined cradle side walls and frame truss members rigidly connected both to said bars and to said frames.

3. A battery cradle adapted to be supported from the frame side members of an electric vehicle, said cradle comprising, in combination, bottom supporting bars extending across the vehicle frame and beyond the sides thereof, a U-frame carried by each side member of the vehicle frame for suspending said bottom supporting bars from the vehicle frame, sheet metal combined cradle end walls and truss members rigidly connected to said bars and to said U-frames, and bottom-supporting and frame-stiffening bars extending transversely of and connected to said aforementioned bars between said U-frames.

4. In a battery cradle for electric vehicles, the combination with the side members of the vehicle frame, of a U-frame suspended from each vehicle frame side member, bottom supporting bars extending between and beyond said U-frames and carried thereby, other frame structures at the ends of said bottom supporting bars, and sheet metal combined cradle side wall forming and frame trussing members connecting all of said frames.

5. In a battery cradle for electric vehicles, the combination with channeled vehicle frame side members having vertical web portions, of U-frames respectively suspended from the web portions of said frame side members, bottom supporting bars carried by said U-frames and extending between and beyond said U-frames to provide a support upon each frame side member for a substantially counterbalanced arrangement of the batteries, other frame structures at the ends of said bottom supporting bars, and sheet metal combined cradle side wall forming and frame trussing members rigidly connected to all of said frames.

6. A battery cradle for electric vehicles adapted to carry a part of the battery between the vehicle frame side members and other parts of the battery outside said frame members and comprising, in combination, a U-frame suspended from each side member, bottom supporting bars extending between and beyond said U-frames and carried thereby, said bottom supports being extended beyond the side frame members sufficiently to provide for a substantially counter-balanced arrangement of the batteries with respect to the support-suspending U-frame on each vehicle frame side member, sheet metal cradle side wall forming and frame trussing members extending between and rigidly connected to said U-frames and extending to the ends of said bottom supports and rigidly connected thereto, and frame strengthening rectangles located at the ends of said bottom supports and also rigidly connected to said sheet metal members.

7. A battery cradle symmetrically arranged with respect to the central line of the vehicle, said cradle having central portions and outside portions on each side of the central portions thereof, said outside portions being each higher than its adjacent central portion, and a door opening into each of said outside portions, the height of the outside portions allowing ready access to the batteries situated in the central portions.

8. In a battery cradle for electric vehicles, the combination with the framing of the vehicle including channel frame beams, of plates forming ends of the battery cradle supported from said channel beams, said plates being cut away at the central portion thereof to allow for the passage of the motor shaft past the batteries.

9. A battery cradle for electric vehicles comprising, in combination with the vehicle frame including parallel side channel bars having vertical web portions, a platform for the battery extending between and to the outside of said channel bars, so as to support the weight of the batteries partly between and partly outside of said bars, means for suspending said platform from said channel bars connected to said vertical web portions, and bracing connections between said suspending means confining the downward pull upon said suspending means substantially in the planes of said web portions.

10. A battery cradle adapted to be supported by the side members of the frame of an electric vehicle and comprising, in combination, a U-frame suspended from each side member of the vehicle frame, bars connecting and supported by said U-frames and extending across the vehicle frame beyond said U-frames on each side of the vehicle and trussing members rigidly connected to said bars and U-frames.

11. A battery cradle adapted to be supported by the side members of an electric vehicle and comprising in combination a U-frame suspended from each side member of the vehicle frame, bars connecting and supported by said U-frames and extending across the vehicle frame beyond the said U-frames on each side of the vehicle, similar frames connected to the ends of said bars and trussing members connecting said bars and frames.

12. A battery cradle adapted to be supported by the frame of an electric vehicle and comprising duplicate battery receiving compartments each extending from within one of the side members of the vehicle frame to the outside thereof beyond the frame, and at least one side wall and two end walls for each of said compartments to brace the cradle and form a trussed structure.

13. A battery cradle adapted to be supported by the side members of the frame of an electric vehicle and comprising a cradle frame member having at least three sides suspended from each of said side members of the vehicle frame, bottom supporting bars supported by said cradle frame members and extending across the vehicle frame beyond the side members on each side of the vehicle frame, similar cradle frame members attached to said bars at the opposite ends thereof, cross bars supported on said bottom supporting bars adjacent the center of the cradle, uprights located at the ends of said cross bars, an end wall for each of said compartments secured to said uprights and bracing the cradle transversely and cradle side walls rigidly secured to said bottom supporting bars and to said cradle frame members to truss the cradle structure.

Signed at New York city, N. Y., this 15th day of January, 1920.

CHARLES A. WARD.